Oct. 10, 1950 — C. J. HELLER — 2,524,794
LIGHT REFLECTING MATERIAL
Filed Dec. 22, 1945 — 2 Sheets-Sheet 1
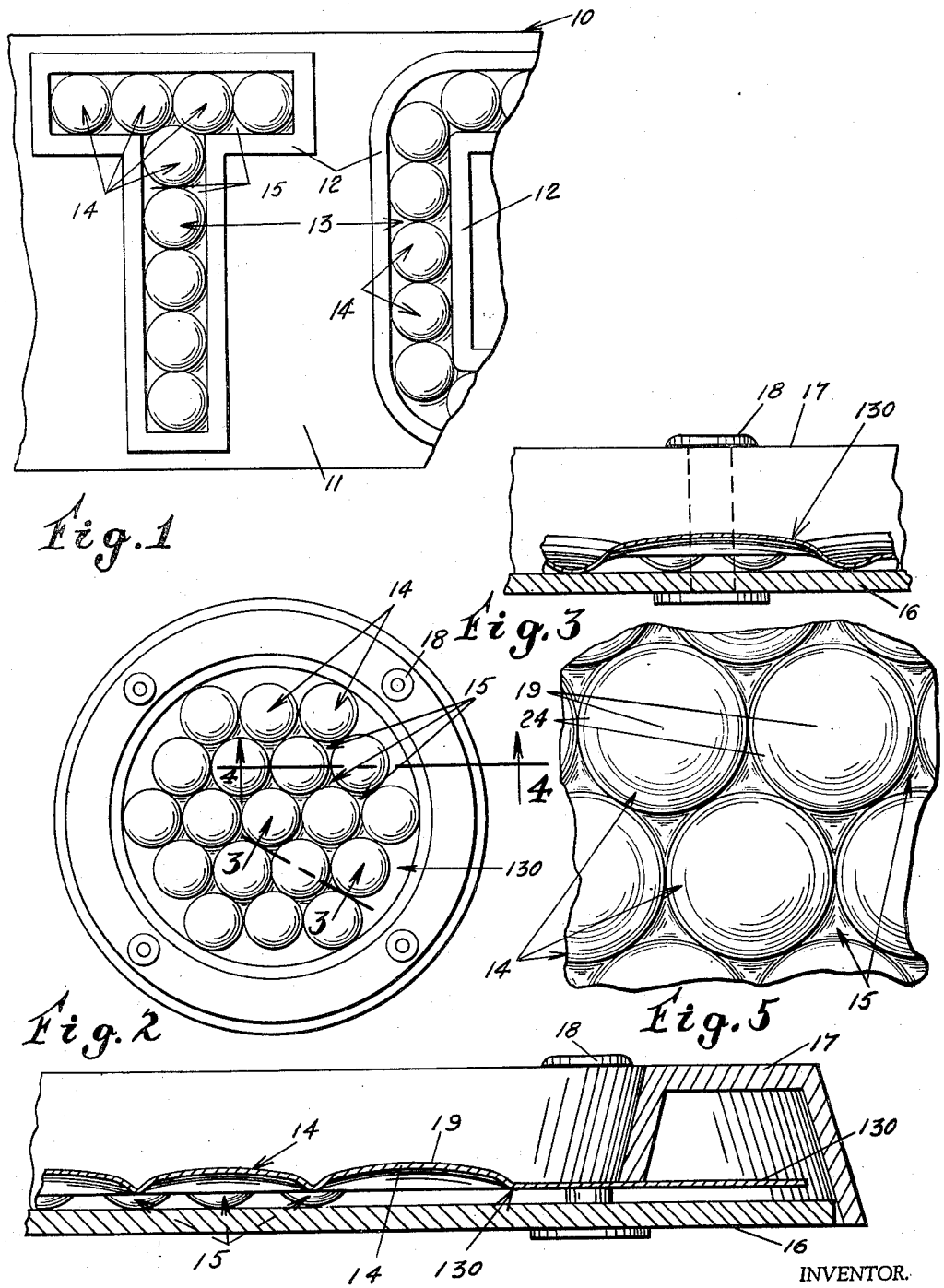
INVENTOR.
Charles J. Heller.
BY Murray, Sackhoff & Paddack.

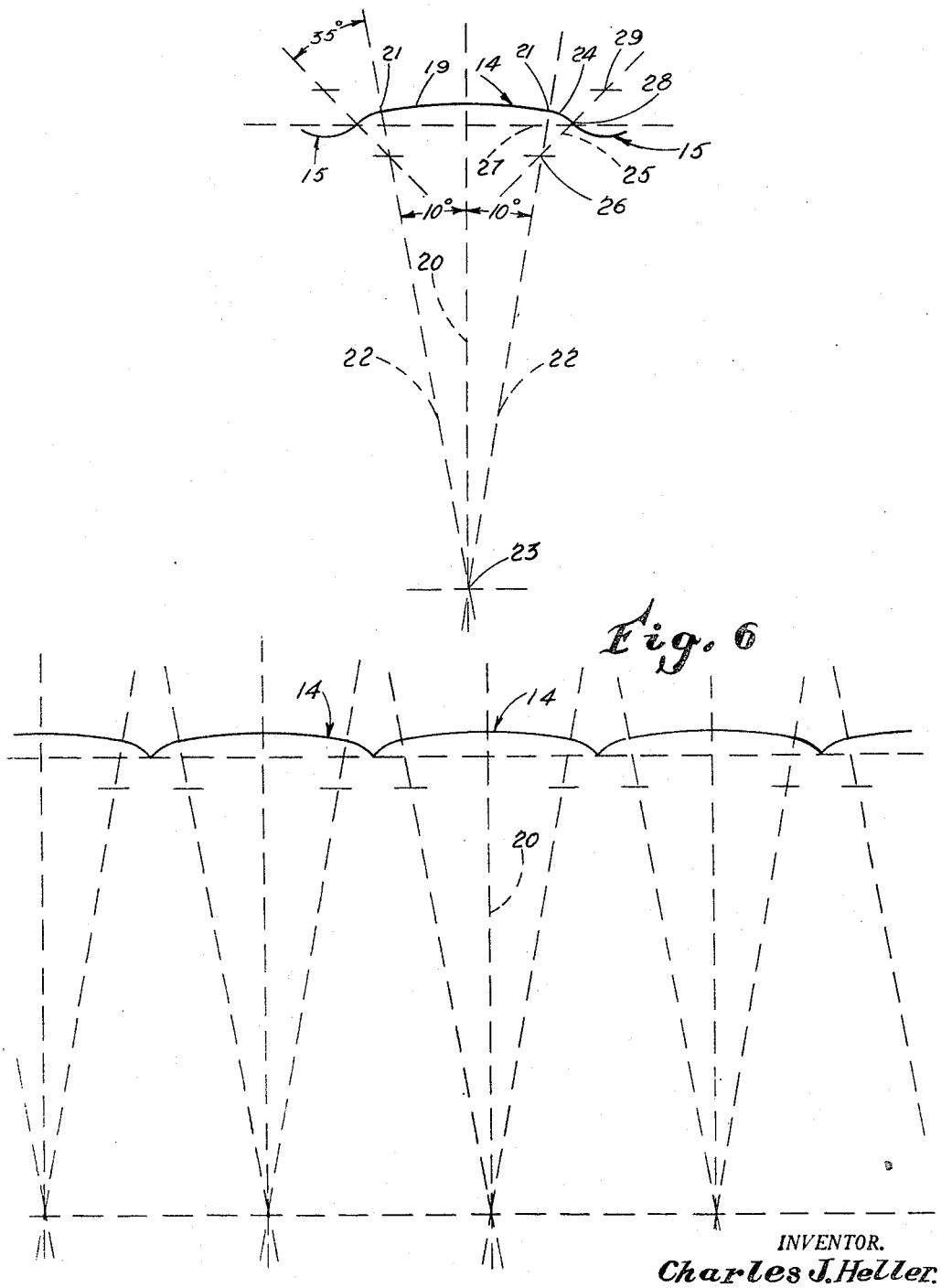

Patented Oct. 10, 1950

2,524,794

UNITED STATES PATENT OFFICE 2,524,794

LIGHT REFLECTING MATERIAL

Charles J. Heller, Fort Thomas, Ky., assignor, by mesne assignments, to Mary Sheehan Zumstein, Fort Thomas, Ky.

Application December 22, 1945, Serial No. 636,729

5 Claims. (Cl. 88—78)

The present invention relates to light reflecting material for use in reflector units, and for various types of light reflecting signs and signals for the highways and for vehicles and which are intended to be rendered visible at night by extraneous light sources.

An object of the invention is to provide light reflecting material for the purposes as stated which provides a high degree of visibility and within a wide included angle between the light source and the point of observation.

Another object of the invention is to provide light reflecting material of the character indicated which has effective visibility at angles to the light source at which heretofore known and approved reflecting material shows no reflectivity whatever.

A further object of the invention is to provide an improved form of reflector button for light reflecting material and to arrange the same and the intervening surface between them so that reflecting material having the aforementioned improved characteristics may be rapidly and economically produced from polished light reflecting sheet metal.

A still further object is to provide light reflecting material having increased reflectivity over previously known material resulting from the use of an improved shape of raised button which produces larger reflected light beams from the arrangement of such buttons in linked or tangent relation so that within a given area either the size or the number of buttons may be increased, and by the utilization of a reflecting concave surface area between the buttons to attain a beneficial cross reflection between said parts of the bosses and/or depressions to increase the visibility of the material and the field of observation, particularly under extraneous illumination at night.

These and other important objects are attained by the means described herein and exemplified in the accompanying drawings in which:

Fig. 1 is a fragmental, front elevational view of a sign embodying the light reflecting material of the invention.

Fig. 2 is a front elevational view of a highway vehicle signal embodying a reflector unit of the invention.

Fig. 3 is an enlarged, cross-sectional view taken on line 3—3 of Fig. 2.

Fig. 4 is an enlarged, cross-sectional view taken on line 4—4 of Fig. 2.

Fig. 5 is an enlarged, fragmental, front elevational view of a piece of light reflecting material embodying the invention.

Fig. 6 is a diagrammatic edge view of the reflecting surface of the material of the invention as taken on line 3—3 of Fig. 2.

Fig. 7 is a diagrammatic edge view of the reflecting surface as taken on line 4—4 of Fig. 2.

Reflecting materials and reflecting units heretofore known and used, have employed raised buttons or substantially semi-spherical convex bosses disposed on a flat plane of a sheet of material so that much of the effectiveness is lost save under limited conditions of extraneous illumination. Other known reflectors have employed angularly shaped bosses which have been arranged to be effective only at predetermined limited angles between the light source and the point of observation. All of these light reflecting materials have been attended by certain disadvantages while accomplishing some specific reflecting function. The disadvantages most frequently attending previously known materials have been those of limited angles of reflection and low visibility at a distance. These disadvantages have been due to limitations imposed on the shape and arrangement of the bosses selected in order to attain some one important function. By the present invention there is attained a light reflecting material or unit of high visibility both as to distance and angular range of visibility. As an additional advantage the light reflecting material of the invention is adapted to produce an unexpected degree of visibility at a wide included angle between the light source and the point of observation by the use of an anodized reflecting film on the reflecting material. In practice reflecting material so formed provides highly efficient light reflection both as to distance and to angularity. When the angle of observation has been increased to such an extent as to render a reflecting surface ineffective under ordinary circumstances, the anodized buttons, as shaped and arranged, take on a distinctive cruciform highlight that makes the unit visible despite the increased angle. On close inspection the said highlight appears to be made up of many fine lines of reflected light on the surface of the metal beneath the polished transparent cover film on the buttons. The method of securing this unique effect comprises the formation of the reflecting surface from a flat sheet of reflecting material after such sheet has been polished and anodized. The light reflecting anodized sheet metal is susceptible to being colored if desired by means and methods forming no part of the present invention, the metal being colored before the material is anodized if a color is desired. The aforementioned unexpected highlights are obtained under conditions of colored or non-colored metal.

Light reflecting material or units embodying the same may be formed from any suitable material which is subject to arrangement of the hereinafter described convex bosses and concave depressions with light reflecting surfaces. The hereinafter described preferred form of the reflecting material is therefore not to be considered as limiting the invention in its broader aspects of improved function over heretofore known reflecting materials.

In the form illustrated the material of the invention is produced by embossing a finished polished sheet of light reflecting material to provide raised convex buttons or bosses in tangent relation while the intervening angular connecting surface portions are concaved and disposed on the opposite side of the mean plane of the sheet with respect to the bases of said buttons or bosses, all of which may be readily seen by an inspection of Figs. 1-5 inclusive of the drawings. The concave, intervening areas are made triangular wherever possible, being bounded by the curved bases of three bosses or buttons tangent to each other and of uniform size. Under certain conditions said concave, intervening surface portions are formed between two uniform buttons and an edge border of the signal sign device embodying the invention. In some instances the concave depression is bounded by two angularly related border edges of a reflector unit and one of the raised bosses which is tangent to both such edges.

Referring now to Fig. 1 of the drawings, a sign 10, which may be a highway sign, is suitably constructed of a sheet metal panel having a background portion 11, raised border portions 12, defining the opposite edges of the sign indicia or reflecting units 13 which are shaped to the form of the desired indicia. The particular mode of construction of the sign panel is not to be considered as controlling since the structure may be formed of an integral sheet or the reflecting units 13 may be formed separately and applied in any suitable fashion in position within the indicia border 12. The reflecting unit 13 in this embodiment comprises single rows of relatively large convex reflector buttons 14 with a compound surface curvature hereinafter more fully described while the intervening portions 15 are constituted by connecting concave or depressed surfaces sloping downwardly from the bases of the adjoining buttons and the border 12. In Fig. 2 there is illustrated a characteristic grouping of a number of convex bosses 14 with intermediate triangular concavities 15 extending below the plane of the bases of said bosses and serving to provide a highly efficient light reflection without appreciable glare. The vehicle signal may comprise in addition to the reflector unit formed as just described, a base plate 16 and a border flange 17 of annular form to clamp the interposed light reflecting unit 130 between the base and flange with the aid of any suitable means such as hollow rivets 18 which may in this arrangement provide for the reception of mounting screws (not shown) for fastening the signal on a vehicle body.

As will be readily appreciated upon an inspection of Figs. 3-7 inclusive, the convex bosses or raised buttons which are now indicated generally by the reference numeral 14 have a major center area 19, the curvature of which is formed on a long radius 20 which in Figs. 6 and 7 may be considered as passing through the true center of the boss 14. The diameter of the curved center area 19 is such that a line 22 passing therethrough intersecting the said circumference 21 and the lateral center 23 will lie at an angle of approximately 10° from the center radius 20. In general this relationship may be expressed alternatively in the statement that the radius on which the curved central area 19 is formed is nearly three times the diameter of the area. The center area 19 is bounded by an annular base portion 24, the curvature of which is on a shorter radius 25, the center 26 of which can be found on line 22 remote from center 23. The radius of the curve 24 may be from one-fifth ($\frac{1}{5}$) to one-twentieth ($\frac{1}{20}$) of the radii 22, and in practice I prefer to make this smaller radius approximately one-tenth ($\frac{1}{10}$) of the longer radius. The major diameter of the annular curved outer portion 24 intersects the plane of the mean top surface 27 of the reflecting sheet as at 28 and covers at any point an included angle of about thirty-five (35°) degrees measured between point 21 on the circumference of the major area 19 and point 28 on the major circumference of the annular portion 24 about the radial point 26. The distance between points 26 and 23 is laid off on the continuation of line 25 to provide a radial point 29 which is a center for the concave curvature of depression 15 taken on a section passing through the point of tangency of two of the bosses and through the center of the third boss which is mutually tangent to them.

By utilizing the aforementioned mode of realizing the curvature and proportionate size of the bosses and the depressions, the improved reflecting properties are attained in a very simple and economical fashion when the reflecting material is made of light reflecting sheet metal. Comparatively simple and inexpensive compound dies may be made for producing the desired surface at one operation and it has been found that in working with anodized light reflecting material sheets the embossing operation may produce in some areas the appearance of infinitesimally fine lines which are believed to be rupture lines in the surface of the metal beneath the transparent anodizing film but which have no apparent effect upon the permanency of the reflecting surface.

It will be understood that in the formation of signs, the indicia will be desirably made up of single rows of tangent bosses with accompanying intermediate concavities as aforementioned. In the provision of circular plates such as vehicle signals as illustrated for example in Fig. 2, the number and size of the convex bosses is adapted for maximum coverage of the circular area with bosses and concavities in balanced and ornamental relation. As a specific example it may be stated that excellent results have been attained by utilizing bosses of approximately seven-eighths ($\frac{7}{8}''$) of an inch in diameter to form a vehicle signal device having a reflector unit four (4'') inches in diameter. Good visibility of these signals from a long distance is attained whether the illumination at night is derived from the light on the vehicle or solely from some outside source.

Reflector units of the invention afford an extreme angle of reflection of the order of 100° to 102° and good visibility obtains throughout this wide included angle. Due to the hereinbefore described arrangement the wide angle of reflection is effective in the horizontal plane, the vertical plane and all intermediate planes. For this reason highway direction and warning signals embodying the invention are of especial utility not only on straight line roads, but on both winding and hilly roads. Moreover, the effectiveness of the device is not destroyed when the mounting post for the sign or signal becomes somewhat dislocated as by being bent, or originally installed in a non-perpendicular position. In a corresponding manner the same general advantages may be secured for airports, landing fields etc. since the landing lights of the aircraft, regardless of the angle of approach of the aircraft, will readily render the signals or markers embodying the invention visible to such craft and to other craft which may be aloft in the general vicinity.

It may be noted that reflecting signs and signals have always been subject to malicious or mischievous breakage or damaging especially when located on, or near highways. It is pointed out, however, that signs and signals embodying the present invention, when formed of polished anodized sheet aluminum are not destroyed by being struck with missiles and the area affected thereby is comparatively small and it is merely altered but not deprived of its light reflecting properties. For this reason highway signals embodying the invention are particularly long lived as compared to devices heretofore known and used. The inherent light reflecting properties of the metal are long enduring and are kept reasonably clean by heavy rains and wind during many seasons of the year. The task of manually cleaning these signs consists in merely wiping the dust therefrom when an unusual accumulation is present.

What is claimed is:

1. Light reflecting material having a light reflecting surface comprising low and relatively large circular convex bosses tangentially connected in the plane of their bases, each of said bosses having a circular central portion comprising the major area of the boss, the surface curvature of which is developed on a radius greater than the diameter of said area and a surrounding connected annular surface area of an arcuate cross section, the curvature of which is developed on a radius of from one-fifth to one-twentieth the radius of the surface curvature of said center portion, each boss and two adjacent mutually tangent bosses, forming between them a fundamentally triangular area, said area being reversely curved at its tangent sides with respect to the bounding surface area of each boss, and concaved below the plane of the points of tangency of said bosses.

2. Light reflecting material having a light reflecting surface comprising relatively large circular convex bosses tangentially connected in the plane of their bases, each of said bosses having a circular central portion comprising the major area of the boss, the surface curvature of which is developed on a radius greater than the diameter of said area and a surrounding connected annular surface area of an arcuate cross section, the curvature of which is developed on a radius of from one-fifth to one-twentieth the radius of the surface curvature of said center portion, the area intermediate tangent bosses being triangular.

3. Light reflecting material having a light reflecting surface comprising relatively large circular convex bosses tangentially connected in the plane of their bases, each of said bosses having a circular central portion comprising the major area of the boss, the surface curvature of which is developed on a radius greater than the diameter of said area and a surrounding connected annular surface area of an arcuate cross section, the curvature of which is developed on a radius of from one-fifth to one-twentieth the radius of the surface curvature of said center portion, the area intermediate tangent bosses being triangular and depressed as a relatively shallow reversely curved concavity below the plane of the bases of said bosses.

4. Light reflecting material having a light reflecting surface comprising relatively large circular convex bosses tangentially connected in the plane of their bases, each of said bosses having a circular central portion comprising the major area of the boss, the surface curvature of which is developed on a radius greater than the diameter of said area and a surrounding connected annular surface area of an arcuate cross section, the curvature of which is developed on a radius of from one-fifth to one-twentieth the radius of the surface curvature of said center portion, the areas intermediate tangent bosses being triangular and depressed below the plane of the bases of said bosses, and having a generally reversed curvature with relation to the surrounding bosses, the degree of curvature being approximately equal to that of the annular surface of the surrounding bosses.

5. Light reflecting material having a light reflecting surface comprising relatively large circular convex bosses tangentially connected in the plane of their bases, each of said bosses having a circular central portion comprising the major area of the boss, the surface curvature of which is developed on a radius greater than the diameter of said area and a surrounding connected annular surface area of an arcuate cross section, the curvature of which is developed on a radius which is approximately one-tenth the radius of the surface curvature of said center portion, the area intermediate tangent bosses being triangular and depressed below the plane of the bases of said bosses.

CHARLES J. HELLER.

REFERENCES CITED

The following references are of record in the file of this patent:

UNITED STATES PATENTS

| Number | Name | Date |
| --- | --- | --- |
| 1,885,294 | Robertson | Nov. 1, 1932 |
| 1,967,602 | Young | July 24, 1934 |
| 2,043,690 | Arbuckle at al. | June 9, 1936 |
| 2,044,620 | Matthai | June 16, 1936 |
| 2,181,725 | Eckel | Nov. 28, 1939 |
| 2,217,125 | Meigs | Oct. 8, 1940 |
| 2,263,953 | Morcom | Nov. 25, 1941 |

FOREIGN PATENTS

| Number | Country | Date |
| --- | --- | --- |
| 19,768 | Great Britain | of 1903 |
| 21,704 | Great Britain | of 1911 |
| 148,830 | Switzerland | Oct. 16, 1931 |
| 443,759 | Great Britain | Mar. 5, 1936 |